(12) United States Patent
Overskeid et al.

(10) Patent No.: US 8,454,245 B2
(45) Date of Patent: Jun. 4, 2013

(54) SYSTEM FOR CONTROLLED APPLICATION OF HERBICIDES

(75) Inventors: Oyvind Overskeid, Langhus (NO); Arne Hoeg, Hvalstad (NO); Sigmund Overeng, Oslo (NO); Hein Olai Stavlund, Rygge (NO)

(73) Assignee: Dimensions Agri Technologies AS, Rena (NO)

( * ) Notice: Subject to any disclaimer, the term of this patent is extended or adjusted under 35 U.S.C. 154(b) by 810 days.

(21) Appl. No.: 11/988,481

(22) PCT Filed: Jul. 7, 2006

(86) PCT No.: PCT/NO2006/000261
§ 371 (c)(1),
(2), (4) Date: Sep. 15, 2009

(87) PCT Pub. No.: WO2007/008079
PCT Pub. Date: Jan. 18, 2007

(65) Prior Publication Data
US 2011/0147479 A1    Jun. 23, 2011

(30) Foreign Application Priority Data

Jul. 8, 2005 (NO) .................................. 20053336

(51) Int. Cl.
*G03B 17/00* (2006.01)
(52) U.S. Cl.
USPC ......................................................... 396/427

(58) Field of Classification Search
USPC .......... 396/427, 428; 47/1.7; 348/89; 239/159
See application file for complete search history.

(56) References Cited

U.S. PATENT DOCUMENTS

| 5,306,209 A | 4/1994 | Lang |
| 5,394,208 A * | 2/1995 | Campbell ..................... 396/429 |
| 5,606,821 A * | 3/1997 | Sadjadi et al. .................... 47/1.7 |
| 5,767,905 A * | 6/1998 | Archambo ..................... 348/373 |
| 5,793,035 A * | 8/1998 | Beck et al. ................. 250/222.1 |
| 6,212,962 B1 | 4/2001 | Lucas |
| 6,362,889 B1 * | 3/2002 | Mustonen ..................... 356/428 |
| 6,443,365 B1 | 9/2002 | Tucker et al. |
| 2007/0206942 A1 * | 9/2007 | Gyde Heaven et al. ...... 396/287 |
| 2011/0147479 A1 * | 6/2011 | Overskeid et al. .............. 239/71 |

FOREIGN PATENT DOCUMENTS

| DE | 4446481 A1 | 6/1996 |
| EP | 1000540 A1 | 5/2000 |
| EP | 1004240 A1 | 5/2000 |
| NL | 1003948 C1 | 3/1998 |
| WO | WO-9612401 A1 | 5/1996 |
| WO | 00/09990 A1 | 2/2000 |

OTHER PUBLICATIONS

Supplementary European Search Report for Application No. 06769432, dated Nov. 16, 2010.

* cited by examiner

*Primary Examiner* — W B Perkey
(74) *Attorney, Agent, or Firm* — Nelson Mullins Riley & Scarborough LLP; Anthony A. Laurentano

(57) ABSTRACT

Camera for use in a system and system for detection of weeds and controlled application of herbicides, where the camera lens is protected from dust and mist by a generated air flow.

6 Claims, 2 Drawing Sheets

SYSTEM FOR CONTROLLED APPLICATION OF HERBICIDES

RELATED APPLICATIONS

Figure 1:
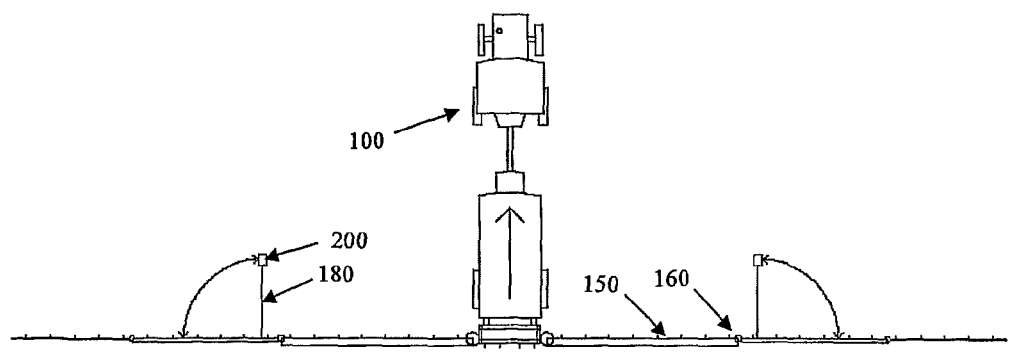

This application is a 35 U.S.C. 371 national stage filing of International Application No. PCT/NO2006/000261, filed 7 Jul. 2006, which claims priority to Norway Patent Application No. 2005 3336 filed on 8 Jul. 2005 in Norway. The contents of the aforementioned applications are hereby incorporated by reference.

FIELD OF THE INVENTION

The present invention relates to a system for the optimal application of herbicides on weed over large areas. More particularly, the invention relates to details of devices comprising a system for identifying weed and controlling herbicide spraying based on machine vision.

PRIOR ART

The spraying of herbicides to fight weed kills or reduces the growth of weed, but spraying may also cause damage to the (utility) crop plants. Herbicide residues may be left in crop plants, soil, air, and water. As a result, people may be affected by herbicides during preparation or use.

Systems for identifying weed may reduce the use of herbicides by only spraying at places in which weed would otherwise retard the growth of (utility) crop plants. Automatic systems utilizing machine vision for the identification of weed provide a means for planning which areas to spray with herbicides. The systems may exploit the manner in which weed spreads itself in the field, and possibly also how crop plants are distributed in the field. Pattern recognition may be used for identifying various species or types of plants grouped by size, cluster formation, parameters describing shape, or common botanical features.

It is shown that the distribution of weed in a field often forms patterns extending over areas of several meters, so that a portion of the field may be diagnosed and treated based on the analysis of one or more smaller regions within or nearby that portion.

Automatic systems based on machine vision and pattern recognition algorithms often perform analyses of small regions to compile a map consisting of larger areas, in which the amount of weed collected and/or different species is estimated for each field. The planning of herbicide application is carried out based on this map, which may be a visual map or only consist of a data set. The planning of spraying and/or control of the spraying process may be fully or partially automated.

Several automatic systems for the identification of weed are known. The systems are based on the digital photography of small portions of the field, the electronic analysis of the images using pattern recognition, and the compilation of maps of weed quantities.

There are several drawbacks associated with the prior art. The digital photography in a field is complicated by a number of factors: The available time is often limited, and large areas are to be diagnosed using uniformly captured pictures, requiring a large number of pictures to be taken. In order to save time the pictures are taken while the camera(s) is/are moving rapidly across the field. Hence, a short shutter time is necessary to avoid blurring caused by the movement. The distance from the cameras to the field is not always possible to predict or plan, and it is therefore necessary to use a small aperture and/or small picture chips in order to achieve a sufficient depth of field. In many cases, the presence of sunlight will not be sufficient to provide a proper exposure at the shutter times and apertures necessary to obtain a satisfactory picture quality. Moreover, sunlight may cause problematic shadows from which it may be difficult to extract sufficient color information. Therefore, artificial lighting is used, both in order to increase the quantity of light in general, and to fill shadowed spots in pictures with sufficient light.

The field represents an adverse environment, in which dirt are raised by the wind, wheels, and movement across the field. The dust may deteriorate the picture quality by reducing the visibility and by covering the camera lens or lens cover. In addition, during the spraying, spray mist will be present in the air, reflecting the light, reducing the visibility, and possibly adhering to the lens or lens cover, together with dust.

The power consumption associated with the continuous lighting is large as compared with standard electric systems on agricultural machines.

Today, the time spent diagnosing before spraying the herbicides adds a significant cost. In order to map the occurrence of weed it is necessary to run across the field a first time, and then run across the field again in order to carry out the spraying where needed. Such a time consuming process is often unacceptable in normal operation.

As mentioned above, the present invention relates to a system for identifying weed and controlling herbicide spraying based on machine vision.

The present invention provides solutions that allow the identification of weed and spray control to be performed simultaneously, i.e. the system is integrated with the spraying system in such a manner that the field is photographed and analyzed while being sprayed, and that the spray control is executed based on the analysis results, without requiring several passes through the same region or putting additional restrictions on the traveling speed. The solutions of the invention in combination and separately contributes to making this possible.

SUMMARY OF THE INVENTION

The present invention is intended for use in connection with the efficient spraying of weed killer over large areas, and in an environment associated with dust and spray mist. The invention relates to a machine vision assembly that at least includes means for the sequential capturing of digital pictures, as well as signal processing means to interpret the pictures. The machine vision assembly is characterized in that it includes an air inlet and a pipe surrounding a lens, as well as means to direct the air from the air inlet into the pipe surrounding the lens, establishing an air flow around the lens and out of the machine vision assembly that prevents dust and spray mist from adhering to the lens.

The invention also relates to a system for the controlled spraying of herbicides over large areas, wherein the system includes one or more machine vision assemblies mounted on a spray boom, having spray nozzles, which is attached to a vehicle. The machine vision assemblies then continuously adjust the amount of weed killer fed through the spray nozzles. The system is characterized in that it includes one or more machine vision assemblies as described above which are located at the end of distance arm(s) attached to the spray boom in such a manner that the machine vision assembly will pass a given area before the spray nozzles.

In a system including more than one machine vision assembly the image processing may be performed in only one of the machine vision assemblies, or in an external image processing device.

The invention also includes a system to illuminate the ground from at least two sides of the lens in order to reduce the contrast between light and shadow in the picture. Thus, the light light. This light source is characterized in that it is only switched on when pictures are being taken, and switched off otherwise. In this manner the power consumption of the machine vision assemblies is reduced.

Further characteristic features of the invention are set forth in the dependent claims.

DETAILED DESCRIPTION

Figure 2:
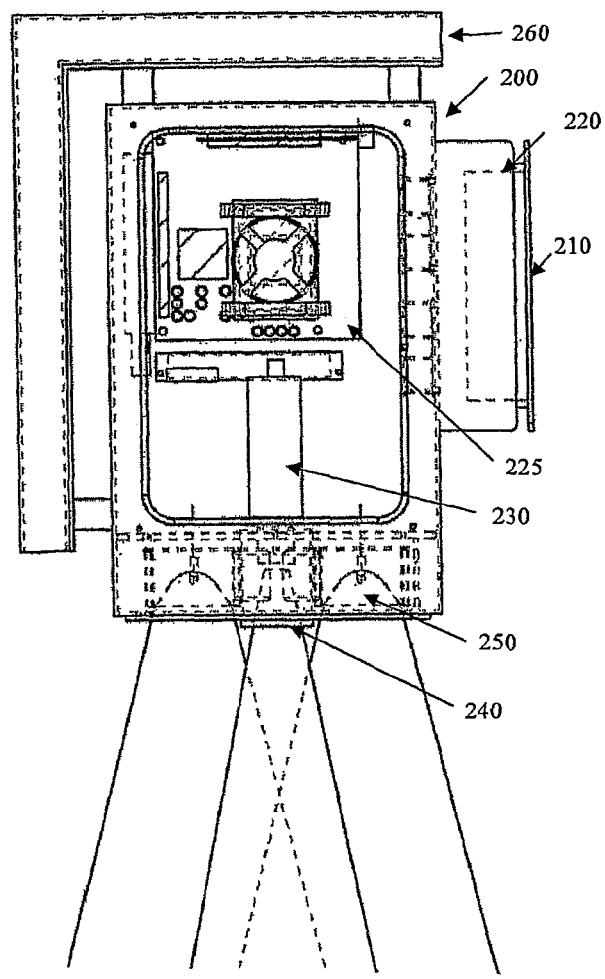
Figure 3:
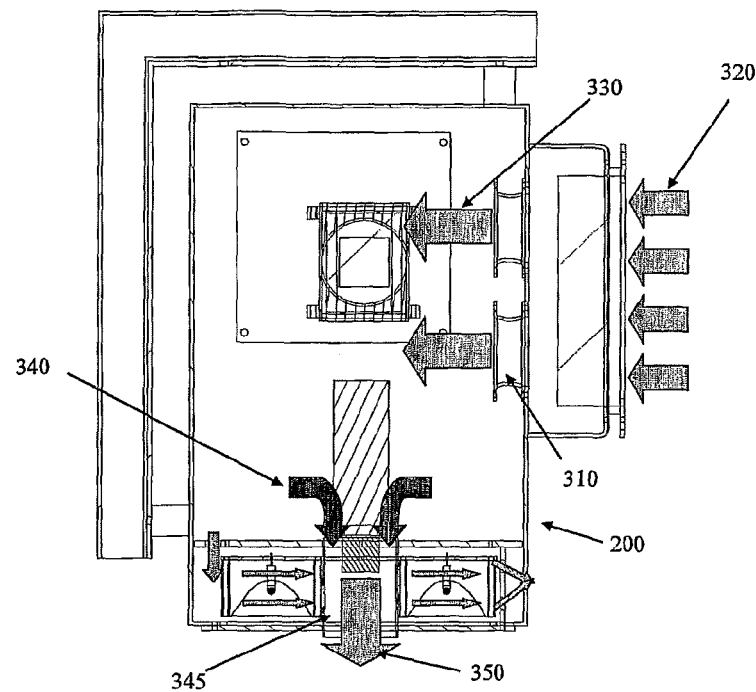

The invention will now be described with reference to the attached drawings, in which:

FIG. 1 shows a schematic of the system for controlled application of herbicides, FIG. 2 shows details of a preferred embodiment of the camera, and FIG. 3 shows details of the air flow into and within the camera.

FIG. 1 shows a schematic of the system for controlled application of herbicides. One or more cameras 200 are positioned on distance arms 180 in front of the spray boom 150. Spray boom 150 is preferably constituted by extendable/retractable arms. Distance arms 180 ensure that an area is photographed before spray boom 150 passes thereby. This fully or partially compensates for the time spent on analysis, the reaction time in the spray machine, and the speed and fall curve (travel path) of the eradicants. Hence, it will be possible to open or close the spray nozzles based on the analysis results from the digital. pictures.

The distance also ensures that no significant amount of spray mist is present between the camera and photographed portion of the field.

The distance arm 180 may be automatically retracted/extended in connection with retraction and extension of the spray boom. Accordingly, the distance arm 180 may be provided with a motorized extension and retraction mechanism for making the distance arms retractable towards the spray boom.

FIG. 2 shows details of a preferred camera embodiment. Artificial lighting, e.g. in the form of gas discharge tubes 250, is provided near the lens 240 so that incidental light from the surroundings does not significantly influence a picture, and the occurrence of shadows is reduced by having more than one gas discharge tube 250 that have overlapping light arranged in such a manner that light is mainly emitted during exposure time, and to a small extent when photographs are not taken. This leads to a reduced power consumption as compared with the use of continuous illumination. The gas discharge tubes preferably used in the present invention has a power in the order of 10,000-15,000 W. This power is consumed in approximately $\frac{1}{2000}$ second of each second the system is operating. Such a light quantity must be applied in order for the lighting of the pictures to dominate over the sun. It also ensures sufficient light for a shutter time of less than $\frac{1}{10000}$ second and shutter 8, which is needed to obtain sufficiently sharp pictures when, for example, a tractor is running at 10 km/h and the boom height above ground varies with 50 cm. The average consumption of a gas discharge tube is 15 W, owing to the very short period of lighting.

The camera 200 is provided with an air inlet 210, preferably having a filter and/or cyclone separator at the entrance. One or more fans may be provided in connection with the air inlet 210. The air may be utilized for cooling down electronic components on, for example, an ATX motherboard 225 comprising a part of the logic for the interpretation of camera pictures and the following nozzle control. The air entering through air inlet 210 and air filter 220 may also be lead towards the lens 240 and lens cover, constituted by a pipe 345 surrounding the lens 240, and to the lighting device(s), in order to prevent them from being affected by dust and spray mist. This may be implemented using a fan, and having the outlet concentric around a pipe 345 to the lens 240, so that a uniform air flow will be established away from the lens 240 and out of the pipe 345.

FIG. 3 shows details of the air flow inside the camera. Air from the surroundings, indicated at 320, is drawn through the air inlet 210, preferably including an air filter 220, and into the camera assembly 200. By means of one or more fans 310 the air is blown past the processor on a motherboard 225, as indicated with arrows 330.

A portion of the air is directed out through the pipe surrounding the lens, as indicated with arrows 340. The purpose of this air flow is to prevent dust and spray mist from reaching the lens.

Another portion of the air is directed out past the flashlights in such a manner that direct contact with the high voltage part of the blitz electronics is avoided.

It will be appreciated by those skilled in the art that a number of variations and alternatives

The invention claimed is:

1. A machine vision assembly for use in a system for the controlled spraying of herbicides over large areas in which there may exist an environment with dust and spray mist, wherein the machine vision assembly comprises:

means for the sequential capturing of pictures using a digital camera, signal processing means for interpreting the pictures, an air inlet, a pipe surrounding a lens of the digital camera, means to direct a portion of an air flow from the air inlet into the pipe, creating an overpressure around the lens, wherein an outlet for the portion of the air flow is concentric around the pipe to the lens providing a uniform air flow away from the lens and out of the pipe, preventing dust and spray mist from adhering to the lens; and at least two lighting devices located on each side of the lens to provide a uniform and overlapping lighting, wherein another portion of the air flow from the air inlet is arranged to flow past the at least two lighting devices.

2. The machine vision assembly of claim 1, further comprising one or more fans connected to the air inlet.

3. The machine vision assembly of claim 1, wherein the at least two lighting devices are gas discharges tubes.

4. The machine vision assembly of claim 3, wherein the gas discharge tubes have a high power and low discharge time in order to make the lighting dominate the daylight.

5. A system for controlled spraying of herbicides over large areas in which there may exist an environment with dust and spray mist, the system comprising a spray boom having spray nozzles attached to a vehicle, one or more machine vision assemblies according to claim 1, and interpretation electronics to control the spray nozzles, wherein the one or more machine vision assemblies (are located at the end of the distance arms attached to the spray boom at a given distance, so that the one or more machine vision assemblies pass a given area before the spray nozzles.

6. The system of claim 5, wherein the distance arms are pivotly connected to the spray boom.

* * * * *